US011130362B2

(12) United States Patent
Berlinsky

(10) Patent No.: US 11,130,362 B2
(45) Date of Patent: *Sep. 28, 2021

(54) METHOD AND DEVICE FOR PROVIDING ATTACHMENT POINTS FOR A FOLDER

(71) Applicant: Philip J. Berlinsky, Needham, MA (US)

(72) Inventor: Philip J. Berlinsky, Needham, MA (US)

(*) Notice: Subject to any disclaimer, the term of this patent is extended or adjusted under 35 U.S.C. 154(b) by 301 days.

This patent is subject to a terminal disclaimer.

(21) Appl. No.: 16/049,705

(22) Filed: Jul. 30, 2018

(65) Prior Publication Data

US 2018/0333978 A1 Nov. 22, 2018

Related U.S. Application Data

(63) Continuation of application No. 14/171,778, filed on Feb. 4, 2014, now Pat. No. 10,059,141.

(51) Int. Cl.

| | |
|---|---|
| ***B32B 3/24*** | (2006.01) |
| ***B42F 3/00*** | (2006.01) |
| ***B42F 7/02*** | (2006.01) |

(52) U.S. Cl.

CPC ................ *B42F 3/006* (2013.01); *B42F 7/02* (2013.01); *Y10T 156/10* (2015.01); *Y10T 156/1049* (2015.01); *Y10T 428/24331* (2015.01)

(58) Field of Classification Search

CPC ...................................................... B32B 3/266

See application file for complete search history.

(56) References Cited

U.S. PATENT DOCUMENTS

| | | | |
|---|---|---|---|
| 740,086 | A | 9/1903 | Byrne |
| 1,843,771 | A | 2/1932 | Kline |
| 1,869,385 | A | 8/1932 | Maish |
| 2,059,148 | A | 10/1936 | Schade |
| 2,601,853 | A | 7/1952 | Hirszson |

(Continued)

FOREIGN PATENT DOCUMENTS

| | | |
|---|---|---|
| EP | 0066469 | 12/1982 |
| JP | 005001169 | 1/2005 |
| WO | 9943489 | 9/1999 |

OTHER PUBLICATIONS

Philip J. Berlinsky, Inside Folder Repair, Quirky.com collaborative invention website, published sometime after Mar. 24, 2013, 1 page, Quirky.com, USA, downloaded Nov. 23, 2013.

*Primary Examiner* — William P Watkins, III

(74) *Attorney, Agent, or Firm* — Cambridge Technology Law LLC; Maura K. Moran

(57) ABSTRACT

A device for providing attachment points for a folder has a layer of material with an inside surface and an outside surface. The inside surface folds onto itself to form a doubled layer having a folded edge and a cut out section. A supporting segment at or near the folded edge closes the cut out section into an aperture for receiving a closing mechanism of a binder. The device is adhered to the inside of a folder at the folder openings arranged to receive the binder's closing mechanism. When the reinforced folded folder is mounted into a binder, both sides of the folded folder press against the attachment device to contain the attachment device in the folder, and the supporting segment presses against the closing mechanism to contain the folder in the binder.

26 Claims, 9 Drawing Sheets

(56) References Cited

U.S. PATENT DOCUMENTS

| | | | | |
|---|---|---|---|---|
| 2,764,501 | A | 9/1956 | Perri | |
| 4,354,890 | A | 10/1982 | Maffey | |
| 4,718,962 | A | 1/1988 | Goodwin | |
| 4,961,666 | A | 10/1990 | Pitts | |
| 5,364,200 | A | 11/1994 | Russo | |
| 5,378,515 | A | 1/1995 | Hatton | |
| 5,590,972 | A | 1/1997 | Shobin | |
| 7,005,027 | B2 | 2/2006 | Valenti | |
| 10,059,141 | B2 * | 8/2018 | Berlinsky | B42F 3/006 |
| 2012/0280103 | A1 | 11/2012 | Forster | |
| 2015/0217592 | A1 | 8/2015 | Berlinsky | |

* cited by examiner

METHOD AND DEVICE FOR PROVIDING ATTACHMENT POINTS FOR A FOLDER

CROSS-REFERENCE TO RELATED APPLICATION

This application claims the benefit at least in part of the filing date of pending U.S. patent application Ser. No. 14/171,778, for METHOD AND DEVICE FOR PROVIDING ATTACHMENT POINTS FOR A FOLDER, filed Feb. 4, 2014, the entire disclosure of both of which is hereby incorporated by reference.

DESCRIPTION OF THE INVENTION

Field

The present invention relates to the field of folders such as pocket folders that may be used to store documents or other items and that may be mounted into ringed binders, and more specifically to a device used to maintain secure attachment points of a folder within a ringed binder.

Background

In the past, folders such as pocket folders had holes punched into standard locations with which to attach or mounts the folders into a binder. The locations of the holes on the folder corresponded to standard locations of releasable rings on binder. A folder was mounted to the binder by releasing the binder rings (which could be any appropriate shape such as circular or D-shaped), feeding the holes into the corresponding binder rings, and closing the binder rings. Folders with holes as mounting points typically have a high rate of failure, especially folders made from paper, because pressure on the holes from the rings of the binder causes the material between the holes and the edge of the folder to tear.

A folder with torn attachment points cannot be attached into a three ringed binder and therefore must be repaired or replaced. Available repair devices that are used for lighter weight paper products are not suitable to handle folder repair because the loading capacity against the attachment points are too great to achieve sustained use.

Accordingly, it is desirable to provide a method and apparatus to apply reinforced attachment points to a folder so that it may be securely mounted into a ringed binder.

SUMMARY

An improvement in folder design is disclosed in which an attachment device provides primary attachment, reinforcement, or repair of a folder at points which the folder would normally be mounted onto a ringed binder. By utilizing a plurality of this device (typically three) one may extend the useful life of a folder, reduce waste created by replacing damaged folders, and reduce the cost of ownership of folders that experience frequent handling.

In one embodiment, the attachment device has a supporting segment, which may be embedded in an adhesive sheet of material or sandwiched between adhesive sheets of material that may press against the closing mechanism to contain the folder in the binder.

The attachment device may have a layer of material with an inside surface and an outside surface. The layer of material may have a main fold line for folding the inside surface of the layer of material onto itself along the main fold line to form a doubled layer having a folded edge. The layer of material may have a first hole and a second hole arranged such that, when the inside surface of the layer of material is folded onto itself along the main fold line, the first hole is superimposed over the second hole and the superimposed holes define a cut out section in the folded material.

The attachment device may also have a supporting segment extending along at least a portion of the inside surface of the layer of material and passing across the first hole to close the cut out section into an aperture in the folded material when the inside surface of the layer of material is folded onto itself. The aperture in the doubled layer is arranged to receive a closing mechanism of a binder. In certain embodiments, the first hole in the layer of material extends to the second hole such that, when the inside surface of the layer of material is folded onto itself along the main fold line, the cut out section extends to and causes a break in the folded edge. The supporting segment may extend across the first hole at the folded edge of the attachment device.

The attachment device may also have a retaining sheet applied to at least a portion of the inside surface of the layer of material over the supporting segment to embed the supporting segment into the attachment device.

In certain embodiments, the supporting segment is arranged to extend along at least the portion of the inside surface of the layer of material at the main fold line. The supporting segment may be made of metal, plastic, string, cord, mono-filament or other suitable material. It may be of any suitable cross-section (such as circular, oval, or flat). It may be multi- or single stranded, and it may have sufficient rigidity, when the folder is mounted in the binder and the binder's closing mechanism is pressed against the supporting segment, to prevent reliance or minimize reliance on adhesive bond between the attachment device and the folder for holding the supporting segment in place across the folder openings.

In certain embodiments, adhesive may be applied to the outside surface of the layer of material to cause the outside surface to adhere to an inside surface of the folder. The adhesive may be pressure sensitive or it may be any other suitable kind of adhesive. In still further embodiments, a backing sheet may cover and protect the adhesive on the outside surface of the layer of material. The backing sheet may have a release coating on its surface for easy removal of the backing sheet when the outside surface of the attachment device is being adhered to the inside surface of the folder.

In other embodiments, a method is provided for providing attachment points for a folder for use in a binder using an attachment device that has an aperture defined by a hole in the attachment device and a supporting segment extending across the hole along or parallel to at least a portion of an edge of the attachment device. The attachment device may be attached to a folder with an outside surface, an inside surface folded over itself at a folder fold line, and folder openings in both sides of the folded folder near the folder fold line. The folder openings are arranged to superimpose over each other on the folded folder and are further arranged to receive a closing mechanism of the binder.

In the method, the attachment device may be sandwiched within the folded folder, with the attachment device aperture being sandwiched between the folder openings, and with the supporting segment being positioned at or near the folder fold line between the folder fold line and a far edge of the sandwiched attachment aperture and folder openings. The attachment device may be attached to the folded inside surface of the folder with the edge of the attachment device at or near the folder fold line. The edge of the attachment device may be formed by folding the attachment device onto itself along a main fold line on the attachment device. Both sides of the folded folder may be arranged to press against the attachment device to contain the attachment device in the folder, and the supporting segment may be arranged to press against the closing mechanism to contain the folder in the binder.

In further embodiments, the attachment device may be attached to the folded inside surface of the folder by removing a first portion of a backing sheet on an outside surface of the attachment device to expose a first portion of adhesive on the outside surface of the attachment device; and positioning the attachment device so that the main fold line of the attachment device extends along the folder fold line. The first portion of exposed adhesive may be pressed to the folder. A second portion of a backing sheet on the outside surface of the attachment device may be removed to expose a second portion of adhesive on the outside surface of the attachment device. An inside surface of the attachment device may be folded on to itself along the main fold line of the attachment device to form the edge of the attachment device; and the second portion of exposed adhesive may be pressed to the folder.

In other embodiments, a method is provided for attaching a folder into a binder using an attachment device. The attachment device has an aperture that is defined by a hole in the attachment device and a supporting segment extending across the hole along or parallel to at least a portion of an edge of the attachment device. The attachment device may be sandwiched within a folded folder, with the folder having an outside surface, an inside surface folded over itself at a folder fold line, and folder openings in both sides of the folded folder near the folder fold line. The folder openings are arranged to superimpose over each other on the folded folder, and are further arranged to receive a closing mechanism of the binder.

In the method, the attachment device aperture is sandwiched between the folder openings, and the supporting segment is positioned at or near the folder fold line between the folder fold line and a far edge of the sandwiched attachment aperture and folder openings. Further, the attachment device is attached to the folded inside surface of the folder with the edge of the attachment device at the folder fold line; and the closing mechanism of the binder is fed through the attachment device aperture. Both sides of the folded folder are arranged to press against the attachment device to contain the attachment device in the folder, and the supporting segment is arranged to press against the closing mechanism to contain the folder in the binder.

It is to be understood that both the foregoing general description and the following detailed description are exemplary and explanatory only and are not restrictive of the invention, as claimed. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one (several) embodiment(s) of the invention and together with the description, serve to explain the principles of the invention.

DETAILED DESCRIPTION

Reference will now be made in detail to the present exemplary embodiments, examples of which are illustrated in the accompanying drawings. Wherever possible, the same or similar reference numbers will be used throughout the drawings to refer to the same or like parts.

Figure 1:
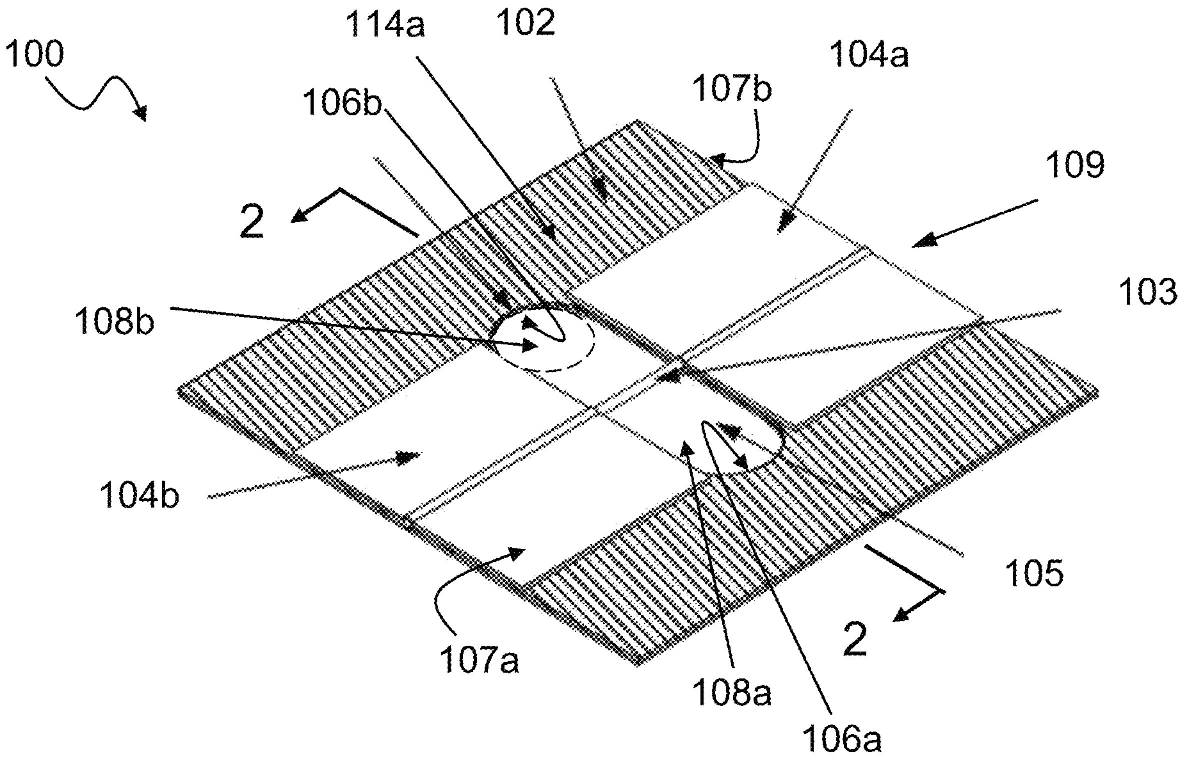
FIG. 1 is a perspective view of a device in accordance with one embodiment of the invention.

FIG. 1 shows in a perspective view of one, but not necessarily preferred, embodiment of an attachment device 100 having a base tape layer of material 102, in which a supporting segment 103 is centrally located, and is secured to the inner surface 107*a* (also known as an inside base surface) of the base layer 102 by two upper tape layer sections 104*a*, 104*b* (each of which are also known as a retaining sheet). The device 100 is folded along a line, for example a main fold line 109 to form a first portion 114*a* of the base and a second portion 114*b* of the base. A slotted opening 105 is located in the center of the base tape layer and contains curved features 106*a*, 106*b*, which allow the supporting segment 103 to be exposed from the top and bottom of the device. The slotted opening 105 may be formed by a first hole 108*a* (also known as a first base hole) that extends along the layer of material 102 to a second hole 108*b* (also known as a second base hole). The attachment device 100 has a main fold line 109 (also known as a base fold line) along the axis of the supporting segment 103.

Figure 2:
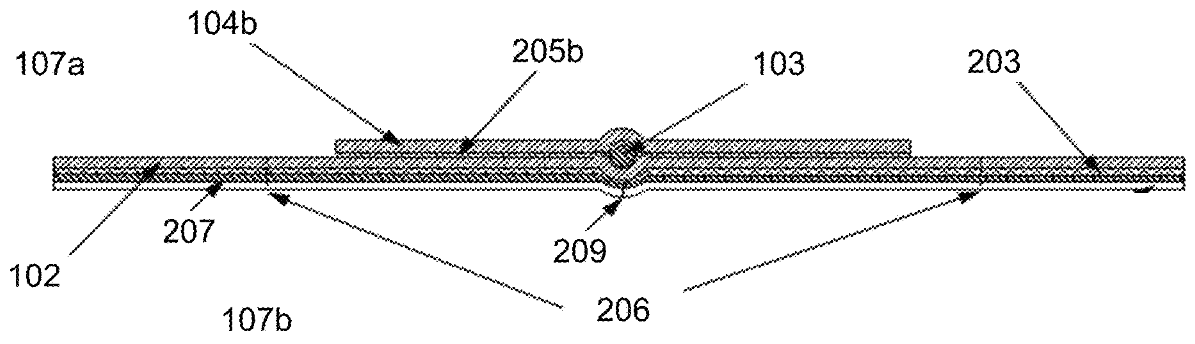
FIG. 2 is a sectional view of the device of FIG. 1 in a section view along a line 2-2.

FIG. 2 shows a sectional view of the attachment device 100 taken along the section lines 2-2 in FIG. 1. The various layers of attachment device 100 include the base layer 102; pressure sensitive adhesive layer 203; and paper backing substrate layer 206 with silicon release coating 207. The paper backing substrate layer 206 is scored at location 209, along a line, for example along the main fold line 109, thereby to subdivide the paper backing substrate layer 206 into two portions. Because of the release properties of the pressure sensitive adhesive 203 against the silicon release layer 207 of backing sheet 206, any or all of the backing portions may be removed to expose respective portions of the pressure sensitive adhesive layer 203.

The supporting segment 103 may be located along the main fold line 109. In one embodiment, when the embedded supporting segment 103 formed of a wire, the supporting segment 103 is located one half of the wire's diameter away from the main fold line 109. Further, in one embodiment, the supporting segment may extend the entire length of the attachment device 100. In other embodiments the supporting segment 103 may extend across a portion of the length of the attachment device 100. The supporting segment 103 location may bisect the slotted opening 105 in the direction of narrowest dimension. In other embodiments, the supporting segment 103 may extend across the slotted opening parallel to and near the main fold line 109. The supporting segment 103 may be made formed of metal, plastic, string, cord, mono-filament or other suitable material. For example, it may be a metal wire. It may be of any suitable cross-section (such as circular, oval, or flat). It may be multi- or single stranded, and—it may have sufficient rigidity, when the folder is mounted in the binder and the binder's closing mechanism is pressed against the supporting segment, to prevent reliance or minimize reliance on adhesive bond between the attachment device and the folder for holding the supporting segment in place across the folder openings. The supporting segment is secured to the base tape layer 102 by fastening two portions of an upper tape layer 104*a*, 104*b* which are bonded to the base tape layer 102 and supporting segment 103 by an adhesive layer 205*b* so as to embed the supporting segment 103 into the attachment device 100. As shown in FIG. 2, the upper tape layer 104*b* is shown bonded to the base tape layer 102 and supporting segment 103 by an adhesive layer 205*b*.

References may now be had to FIG. 3A-7 to illustrate the process of using this device to repair, modify, or create attachment points to a folder that is intended to be used in a binder such as a loose leaf ringed binder.

Figure 3A:
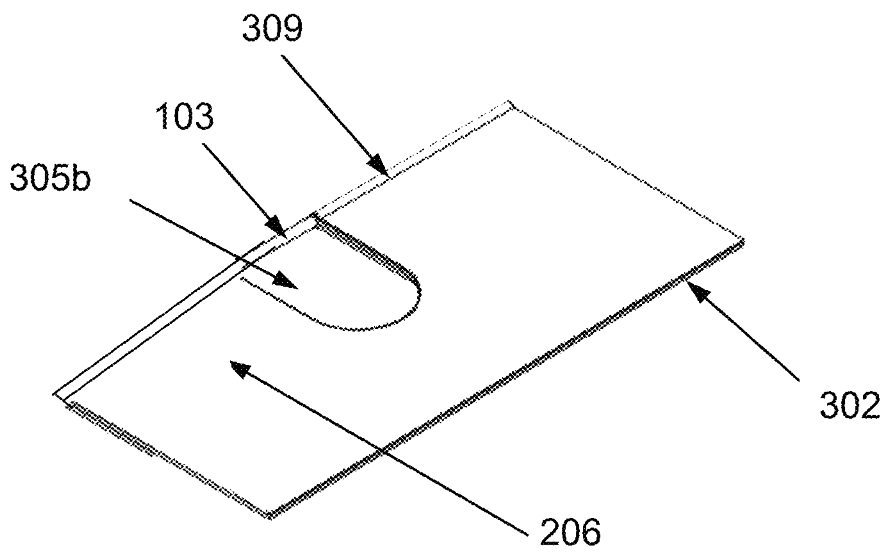
FIG. 3A is a perspective view of the attachment device 100 shown in FIG. 1 folded along a main fold line.
Figure 6:
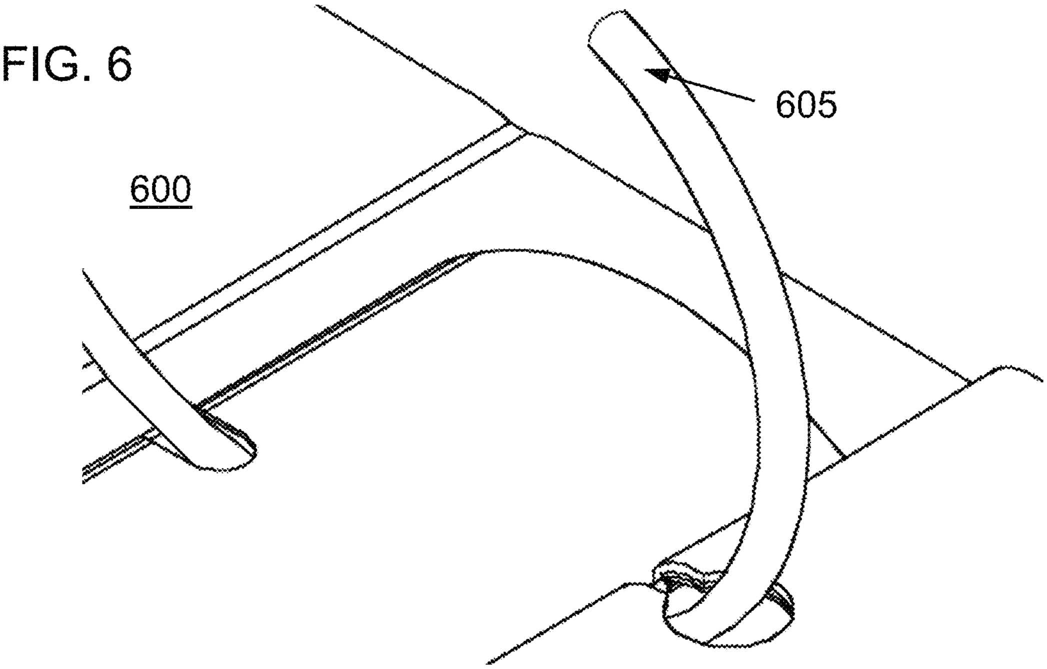
FIG. 6 is a partial perspective view of the outside of the folder showing the device of FIG. 1 attached to the folder, and further showing the folder mounted onto an open ring of a loose leaf binder.
Figure 7:
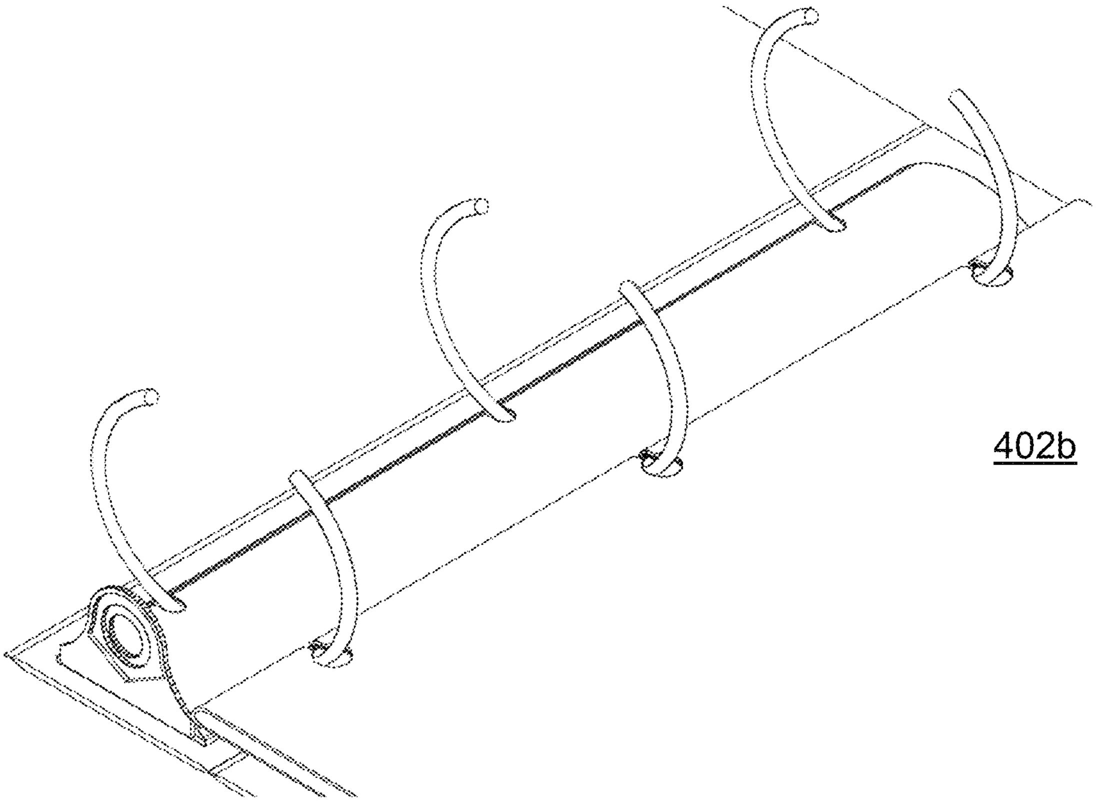
FIG. 7 is a partial perspective view of the folder of FIG. 6 with three devices of FIG. 1 attached to the folder, and further showing the folder mounted onto three corresponding open rings of the loose leaf binder of FIG. 6.

FIG. 3A shows a perspective view of the attachment device 100 shown in FIG. 1 folded along the main fold line 109 to form a doubled layer 302 having a folded edge 309 (also known as a base folded edge). The holes 106*a*, 106*b* are arranged such that, when the inside surface 107*a* of the layer of material 102 is folded onto itself along the main fold line 109, the first hole 106*a* is superimposed over the second hole 106*b*, and the superimposed holes define a cut out section 305*a* in the folded material, in FIG. 3A, forming an extended cut out section that extends to and causes a break 315 in the base folded edge 309. The supporting segment 103 and the edges of the superimposed base holes close the cut-out portion 305*a* to define a closed aperture 305*b* (also known as a closed base aperture) that allows access of a closing mechanism of a binder 600 (such as a reclosable binder ring as shown in FIGS. 6 and 7) to pass unimpeded through the attachment device 100.

Figure 3B:
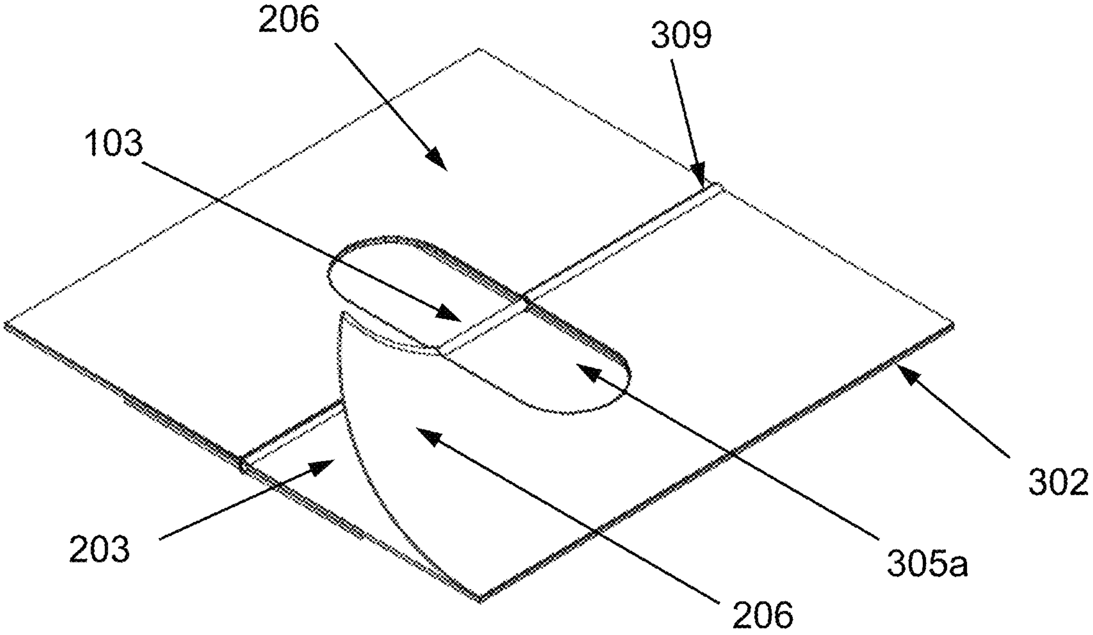
FIG. 3B is a plan view of the device 100 showing removal of one half of the backing sheet.

As shown in FIG. 3B, the backing sheet 206 with its release layer 207 is divided into two portions (which may be identical) along the main fold line 309 so that half of the backing substrate 206 may be removed during application of the attachment device 100 to the folder (shown in FIG. 4) in order to more easily align the device 100 in the folder. The adhesive layer 203 may be a strong adhesive to securely or even permanently secure the attachment device to the folder. Alternatively, the layer 203 may be a low-adhesive or re-adherable material designed for temporarily attaching the attachment device 100 to the folder. For example, the adhesive may be of the kinds described in U.S. Pat. No. 5,194,299, entitled "Repositionable Pressure-Sensitive Adhesive Sheet Material."

Figure 4:
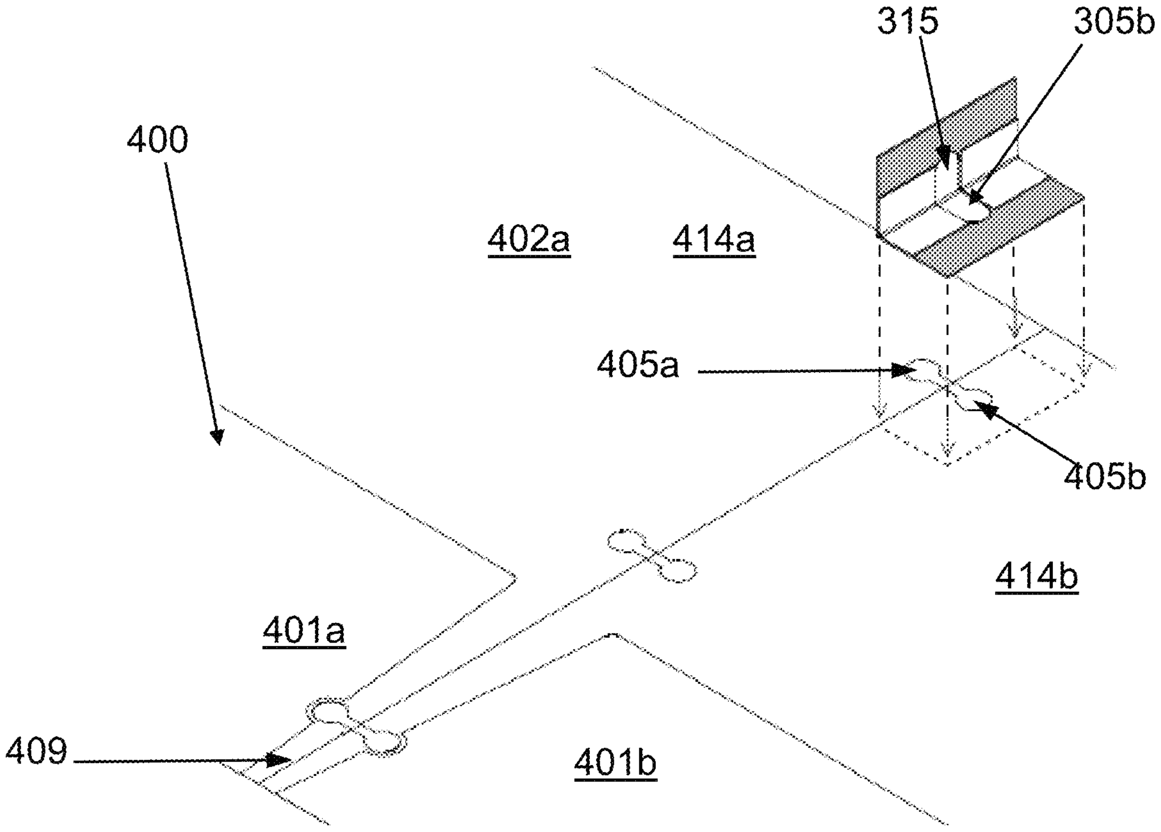
FIG. 4 is a perspective view of the device of FIG. 1, showing the initiation of application of the device to a folder.
Figure 5:
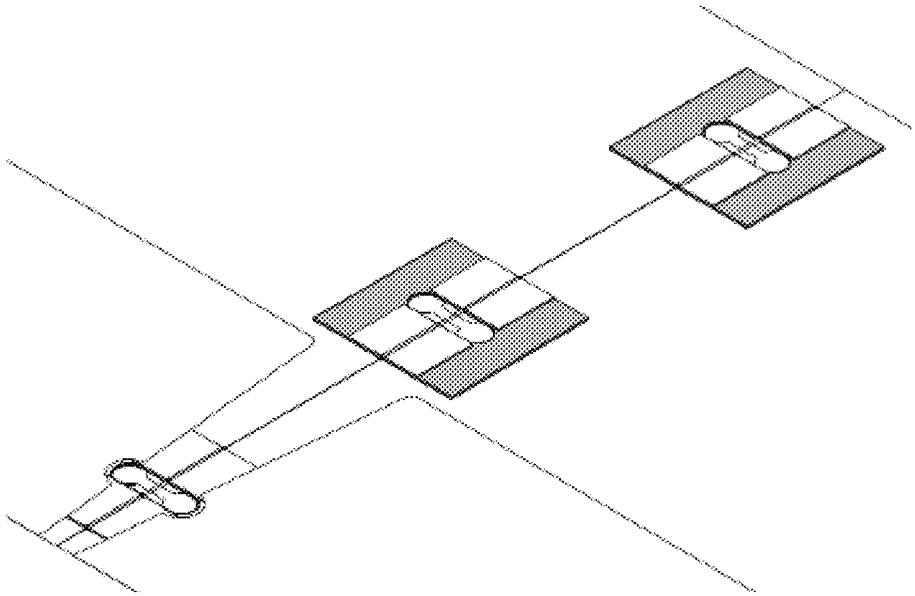
FIG. 5 is a partial perspective view of the inside of the folder of FIG. 4, showing at least one device of FIG. 1 attached to the folder.

FIG. 4 shows one method for attaching the attachment device 100 to a folder for use in a binder. As shown in FIG. 4, the attachment device 100 may be attached to a folder 400 with an outside surface 402*b* (shown in FIG. 7 and also known as an outside base surface), an inside surface 402*b* folded over itself at a folder fold line 409, and folder openings (first folder opening 405*a*, and second folder opening 405*b*) in both sides of the folded folder near the folder fold line 409. The folder openings 405*a*, 405*b* are arranged to superimpose over each other on the folded folder and are further arranged to receive a closing mechanism of the binder. The folder openings 405*a*, 405*b* may be circular or oval holes.

Before applying the device to a folder 400, the intended attachment points may be modified to facilitate mounting of the attachment device. For example, the area surrounding the intended attachment point of the sheet may be modified to remove sheet material that may obstruct the slotted feature of the device. Alternatively, as shown in FIG. 4, they may be cleared of material obstruction if the holes were previously damaged during folder use. For folders that include attachment points through punched holes at holes 405*a*, 405*b*, a modification may be made to the folder 400 at the intersection of the main fold line 409 and the implied line that crosses holes 405*a*, 405*b* of a single attachment point. The folder may be trimmed between the holes 405*a*, 405*b* into slots, ovals, or cut-out sections. In one embodiment, the width of an attachment point modification may be smaller than the width of the holes 405*a*, 405*b* of the folder 400 and the slotted opening 105 of the attachment device 100 in their narrowest dimension. In folder designs that do not have attachment points defined by punched holes other modifications may be made. Modification to the folder may not be required if the folder is slotted at the intended attachment points to fit into a binder but not to be secured to a binder's closing mechanism without application of the device described above.

As shown in FIG. 4, a first portion of the backing sheet 206 on the outside surface 107*b* of the attachment device 100 may be removed to expose the adhesive layer 203 on the outside surface 107*b* of the attachment device 100; and positioning the attachment device on the folder 400.

As seen in FIG. 3B, one portion of the backing sheet 206 is removed to expose the adhesive coated portion of the device 100. Either portion of the backing sheet may be removed first. The device may be folded slightly along the main fold line 109 in order to assist removal of the backing sheet and to facilitate positioning of the device on the folder. The inner surface 107*a* of the attachment device 100 may be folded onto itself along the main fold line 109 to create the edge 309.

The attachment device 100 with a portion of its adhesive layer 203 exposed may be positioned on the folder 400 with the edge 309 of the attachment device 100 at or near the folder fold line 409 so that the main fold line 109 of the attachment device extends along the folder fold line 409, so that the attachment device aperture 305*b* is sandwiched between the folder openings 405*a*, 405*b*, and so that the supporting segment 103 is positioned at or near the folder fold line 409 between the folder fold line 409 and a far edge of the sandwiched attachment aperture 305*b* and folder openings 405*a*, 405*b*.

Once the device 100 is positioned at the appropriate attachment point, the first portion of exposed adhesive 203 may be pressed to the folder 400. The device may then be folded around the main fold line 109 to form the edge 309 of the device 100 along the length of the embedded supporting segment 103. In one embodiment, the folding places the embedded support segment 103 at the edge 309 and in the same plane as the attachment device 100. It is not generally required that the embedded supporting segment 103 be aligned exactly to the edge 309 in order for the device 100 to function properly to provide or reinforce the attachment points of the folder 400.

A second portion of a backing sheet 206 on the outside surface 107*b* of the attachment device 100 may be removed to expose a second portion of adhesive 203 on the outside surface 107*b* of the attachment device. An inside surface 107*a* of the attachment device 100 may be folded to itself along the main fold line 109 of the attachment device to form the edge 309 of the attachment device; and the second portion of exposed adhesive 203 may be pressed to the folder 400. The attachment device 100 is thus secured to both sides of the main fold line of the folder.

Multiple attachment devices 100 may be employed to produce secure attachment points to a folder. The application points may be standard locations that would normally be used to attach a folder to each closing mechanism of a multiple ring binder. The application process is repeated for every attachment point of the folder. As may be viewed in FIG. 5, an attachment device 100 is mounted at each attachment point of the modified folder 400. In the case where the attachment point is adjacent to inside pockets 401*a*, 401*b* of the folder 400, each pocket may be temporarily moved to give access for mounting the device in the obstructed location.

As may be viewed in FIG. 6, a portion of the folder 400 in the closed position and with an attachment device 100 mounted therein is fitted to a ringed binder 600 at an attachment point. The open ring 605 of the ringed binder is inserted through the attachment point of the folder. As may be viewed in FIG. 7, a closed folder 400 with attachment points are reinforced by multiple attachment devices 100. The folder is fully inserted into the open rings 605 of the ringed binder 600. In operation, when the folded folder 400 is mounted into the binder as in FIGS. 6 and 7 with one or more attachment devices 100 installed therein, both sides 401*a*, 401*b* of the folded folder 400 press against the attachment device 100 to hold the attachment device 100 in the folder 400, the folded attachment device 100 compresses the supporting segment 103 against the inside of the folder 400, and the supporting segment 103 presses against the binder's closing mechanism such as ring 605 to contain the folder 400 in the binder 600.

Figure 8:
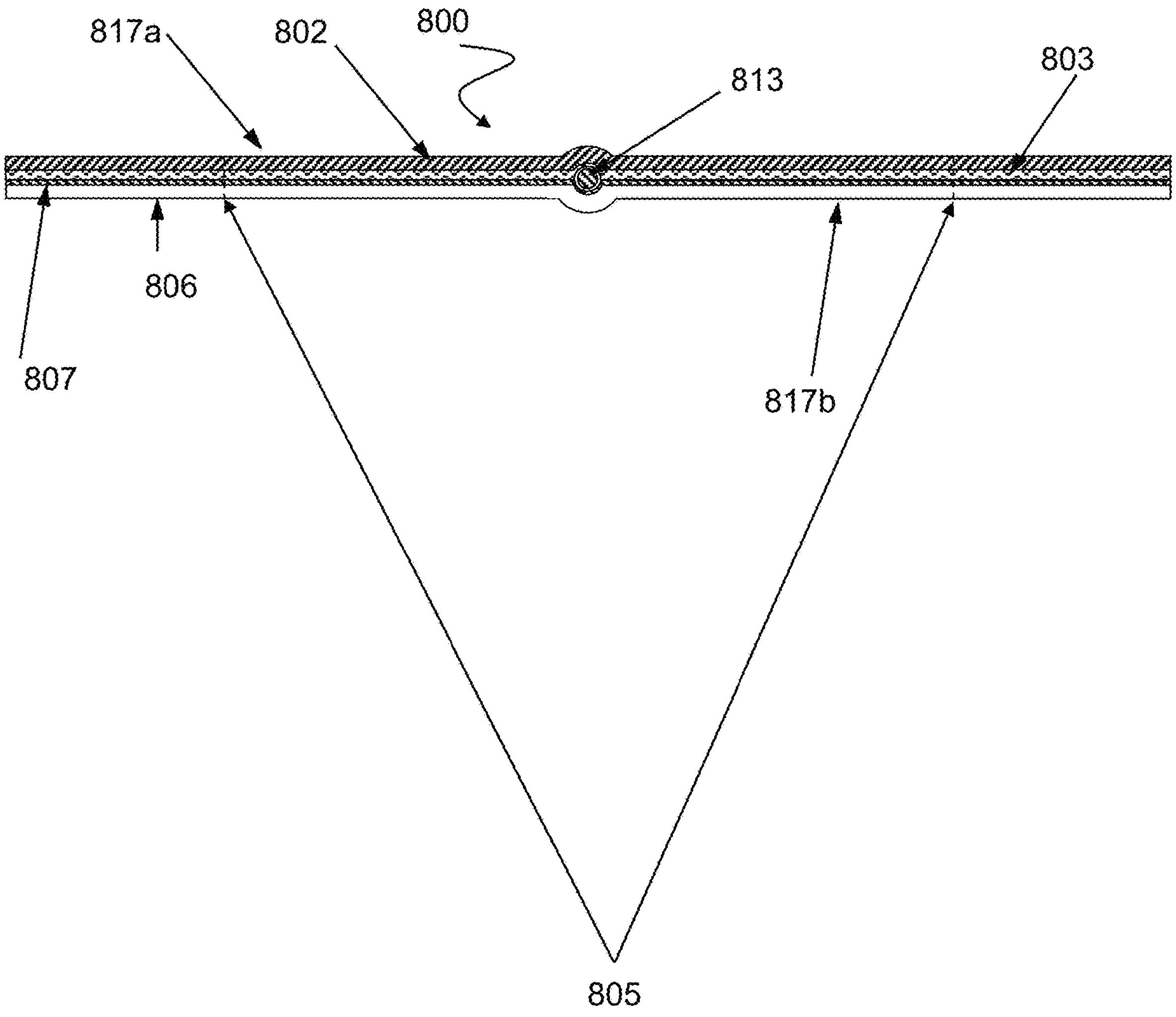
FIG. 8 is a perspective view of a device in accordance with an alternative embodiment of the invention, seen from an upper layer side.

FIG. 8 shows a sectional view of an alternate embodiment of an attachment device 800. In contrast with the attachment device 100, which has a supporting member 103 mounted on the inner surface 107*a* of the base layer 102, the attachment device 800 has a supporting segment 813 on the outer surface 817*b* of the base layer 802.

The various layers of the attachment device 800 include the base layer 802; adhesive layer 803 (which may have the adhesive characteristics and properties of layer 203); and paper backing substrate layer 806 with silicon release coating 807. The supporting segment 813 is sandwiched between the base layer 802 and the base silicon release coating 807, either directly touching the base layer 802 or resting on the adhesive layer 803.

The supporting segment 813 is located along a center fold line and may extend the entire length of the device or only partially across the length of the device 800. The supporting segment 813 bisects a curved slotted opening in the direction of narrowest dimension. The supporting segment 813 is bonded to the base layer 802 by the pressure sensitive adhesive 803 and is covered by the substrate and silicon release layers until the time of application. As with the supporting segment 103 of attachment device 100, the supporting segment 813 may have sufficient rigidity, when the folder is mounted in the binder and the binder's closing mechanism is pressed against the supporting segment, to prevent reliance or minimize reliance on adhesive bond between the attachment device and the folder for holding the supporting segment in place across the folder openings. Application of attachment device 800 to the folder 400 may be performed in the manner described for attachment device 100.

In operation, as with attachment device 100, when the folded folder 400 is mounted into the binder as in FIGS. 6 and 7 with one or more attachment devices 800 installed therein, both sides 401*a*, 401*b* of the folded folder 400 press against the attachment device 800 to hold the attachment device 800 in the folder 400, and the supporting segment 813 presses against the binder's closing mechanism such as ring 605 to contain the folder 400 in the binder 600. Due to the folded attachment device 800 having the supporting segment 813 on the outer surface 817*b* of the base layer 802, the folded attachment device 800 does not compress the supporting segment 813 against the inside of the folder 400. Instead, supporting segment 813 is held securely by being sandwiched between the folded folder 400 and the folded attachment device 800 adhered thereto.

Thus, it can be seen that the devices described will reinforce folder attachment points when inserted into a ringed binder. The devices may be used on a folder where the attachment points have been previously damaged and cannot be retained in a ringed binder. Alternatively, the devices may be used during folder manufacturing as an alternative method for providing attachment points when used in a ringed binder. The devices may be used on a modified folder as a replacement for previous methods of retainment in a ringed binder, and may provide a strong attachment point to a folder as an alternative to existing methods. The described attachment device increases the useful life of a folder because the attachment points are strengthened by the supporting segment which is embedded within the attachment.

One skilled in the art will appreciate that although only one or two of the components identified above is depicted in the Figures, any number of any of these components may be provided. Furthermore, one of ordinary skill in the art will recognize that there may be more than one supporting segment, and that functions provided by one or more components of any of the disclosed systems may be combined or incorporated into another component shown in the Figures.

As one of ordinary skill in the art will appreciate, one or more of units may be optional and may be omitted from implementations in certain embodiments. For example, in order to reduce cost, the user or a manufacturer may choose to reinforce only a portion of a folder's reinforcement points. Thus, giving a folder at least some strong attachment points may be sufficient to retain the folder in the binder and to restrict the folder from turning out of the binder during normal use. Further, for folders having only a portion of its attachments points damaged, in order to reduce cost the user may also apply the device to a portion of the undamaged attachment points in order to provide additional strength to the folder. This insures that a pocket folder would not fall out of the binder if the other un-reinforced attachment points of the folder fail. Thus, the attachment devices described herein may provide additional strength to attachment points of a folder even when only a few of the folder's attachment points are reinforced or repaired.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. It is intended that the specification and examples be considered as exemplary only, with a true scope and spirit of the invention being indicated by the following claims.

The invention claimed is:

1. A device comprising:
a base having:
an inside base surface;
a base fold line between a first base portion and a second base portion;
a first base hole in the first base portion at or near the base fold line;
a second base hole in the second base portion superimposed over the first base hole when the inside base surface is folded onto itself at the base fold line, wherein the superimposed first and second base holes form a closed base aperture in the folded base; and
a base folded edge formed along the base fold line when the inside base surface is folded onto itself, the base folded edge having a reinforced portion at or near the superimposed first and second base holes,
wherein the reinforced portion has a supporting segment at or extending parallel to the base folded edge and embedded into the inside base surface, and
wherein the supporting segment is sandwiched within the device when the base is folded onto itself at the base fold line, and
an adhesive arranged to form an adhesive bond between the device and a folder for adhering the first and second base portions and first and second folder portions, respectively, of the folder when an inside folder surface of the folder is folded onto itself to form a folder fold line, the inside base surface is folded onto itself, and the base folded edge is disposed at or near the folder fold line,
with the closed base aperture aligned with superimposed folder openings on the folder, and
with the device sandwiched within the folder or the folder is sandwiched within the device;
wherein the supporting segment has sufficient rigidity to prevent reliance or minimize reliance on the adhesive bond between the device and the folder to hold the supporting segment in place across the folder openings when the folder is mounted in a binder and a closing mechanism of the binder is pressed against the supporting segment.

2. The device of claim 1, further comprising a retaining sheet applied to at least a portion of the reinforced portion over the supporting segment to embed the supporting segment into the device.

3. The device of claim 1:
further comprising an extended cut out section in the base folded edge formed by the first base hole extending to the second base hole across the base fold line,
wherein the closed base aperture is formed by the supporting segment and edges of the extended cut out section.

4. The device of claim 3, wherein the supporting segment is arranged to extend across the extended cut out section at the base fold line.

5. The device of claim 1, wherein the supporting segment is arranged to extend along the base at the base fold line.

6. The device of claim 1, further comprising a backing sheet over the adhesive, wherein the backing sheet has a release coating facing the adhesive.

7. The device of claim 1,
wherein the base has an outside base surface, and
wherein the adhesive is disposed on the outside base surface and is arranged to adhere the outside base surface to the inside folder surface when the device is sandwiched within the folder.

8. The device of claim 1,
wherein the folder has an outside folder surface; and
wherein the adhesive is disposed on the inside base surface and is arranged to adhere the inside base surface to the outside folder surface when the folder is sandwiched within the device.

9. A method comprising,
folding a base of a device,
wherein the base has an inside base surface, a base fold line between a first base portion and a second base portion, a first base hole in the first base portion at or near the base fold line, and a second base hole in the second base portion at or near the base fold line, and
wherein the folding further comprises folding the inside base surface onto itself to form a base folded edge along at the base fold line, and to superimpose the first base hole and the second base hole to form a closed base aperture in the folded base;
forming a reinforced portion of the base folded edge by reinforcing the base folded edge at or near the superimposed first and second base holes by embedding a supporting segment into the inside base surface at or extending parallel to the base folded edge;
sandwiching the supporting segment within the device when the base is folded onto itself at the base fold line;
sandwiching the device within a folder or the folder within the device
wherein an inside folder surface of the folder is folded onto itself to form a folder fold line, and
wherein the base folded edge is disposed at or near the folder fold line, and
attaching the device to the folder by forming an adhesive bond between adhering the device and the folder with an adhesive, to adhere the first and second base portions and first and second folder portions, respectively, of the folder when an inside folder surface of the folder is folded onto itself to form a folder fold line, the inside base surface is folded onto itself, and the base folded edge is disposed at or near the folder fold line, with the closed base aperture aligned with superimposed folder openings on the folder;
wherein the supporting segment has sufficient rigidity to prevent reliance or minimize reliance on the adhesive bond between the device and the folder to hold the supporting segment in place across the folder openings when the folder is mounted in a binder and a closing mechanism of the binder is pressed against the supporting segment.

10. The method of claim 9,
wherein the base has an outside base surface and the device is sandwiched within the folder, further comprising disposing adhesive on the outside base surface and adhering the outside base surface to the inside folder surface.

11. The method of claim 9, wherein the folder has an outside folder surface; and the folder is sandwiched within the device, and further comprising disposing the adhesive on the inside base surface and adhering the inside base surface to the outside folder surface.

12. The method of claim 9, wherein the folder comprises a first folder portion, a second folder portion, and the folder fold line therebetween;

wherein the superimposed folder openings comprise a first folder opening on the first folder portion and a second folder opening on the second folder portion; and wherein adhering the device to the folder further comprises:

positioning the device on the folder with the base fold line extending along the folder fold line, with the first base hole aligned with the first folder opening, and with the second folder opening superimposed over the second base hole;

pressing a first portion of adhesive applied to the first base portion to the first folder portion, and pressing a second portion of adhesive applied to the second base portion to the second folder portion.

13. The method of claim 9, further comprising:

inserting the folder with a device secured thereto into a binder, with a releasable retainer of the binder passing through the superimposed folder openings; and securing the releasable retainer to contain the folder in the binder by the superimposed folder openings.

14. The method of claim 9, wherein embedding the supporting segment into the inside base surface further comprises applying a retaining sheet to at least a portion of the inside base surface over the supporting segment.

15. The method of claim 9, wherein forming the closed base aperture in the folded base further comprises extending the first base hole across the base fold line to the second base hole to form an extended cut out section that extends from the first base portion to the second base portion across the base fold line, and to create a break in the base folded edge, with the supporting segment and edges of the extended cut out section creating the closed base aperture.

16. A system comprising:

a folder having an inside folder surface, a folder fold line between a first folder portion and a second folder portion, a first folder opening in the first folder portion at or near the folder fold line, and a second folder opening in the second folder portion superimposed over the first folder opening when the inside folder surface is folded onto itself at the folder fold line; and a device having a base with an inside base surface, a base fold line between a first base portion and a second base portion, a first base hole in the first base portion at or near the base fold line, a second base hole in the second base portion superimposed over the first base hole when the base is folded onto itself at the base fold line, wherein the superimposed first and second base holes form a closed base aperture in the folded base; and a base folded edge formed along the base fold line when the inside base surface is folded onto itself along the base fold line, the base folded edge having a reinforced portion at or near the superimposed first and second base holes, wherein the reinforced portion has a supporting segment at or extending parallel to the base folded edge and embedded into the inside base surface, and wherein the supporting segment is sandwiched within the device when the base is folded onto itself at the base fold line, and an adhesive arranged to form an adhesive bond between the device and the folder for adhering the first and second base portions and the first and second folder portions, respectively, when the inside folder surface is folded onto itself, the inside base surface is folded onto itself, and the base folded edge is disposed at or near the folder fold line, with the closed base aperture aligned with the superimposed first and second folder openings, and with the device sandwiched within the folder or the folder is sandwiched within the device;

wherein the supporting segment has sufficient rigidity to prevent reliance or minimize reliance on the adhesive bond between the device and the folder to hold the supporting segment in place across the folder openings when the folder is mounted in a binder and a closing mechanism of the binder is pressed against the supporting segment.

17. The system of claim 16, further comprising a retaining sheet extending across at least a portion of the reinforced portion over the supporting segment to embed the supporting segment into the device.

18. The system of claim 16, further comprising an extended cut out section in the base folded edge formed by the first base hole extending to the second base hole across the base fold line, wherein the closed base aperture is formed by the supporting segment and edges of the extended cut out section.

19. The system of claim 16, wherein the base has an outside base surface, and wherein the adhesive is disposed on the outside base surface and is arranged to adhere the outside base surface to the inside folder surface when the device is sandwiched within the folder.

20. The system of claim 16, wherein the folder has an outside folder surface; and wherein the adhesive is disposed on the inside base surface and is arranged to adhere the inside base surface to the outside folder surface when the folder is sandwiched within the device.

21. The system of claim 18, wherein the supporting segment is arranged to extend across the extended cut out section at the base fold line.

22. The system of claim 16, wherein the supporting segment is arranged to extend along the base at the base fold line.

23. The device of claim 1, wherein the supporting segment has a perimeter that is in contact with the base fold line.

24. The device of claim 1, wherein the adhesive comprises a low-adhesive or re-adherable material arranged for temporarily attaching the device to the folder.

25. The system of claim 16, wherein the supporting segment has a perimeter that is in contact with the base fold line.

26. The system of claim 16, wherein the adhesive comprises a low-adhesive or re-adherable material arranged for temporarily attaching the device to the folder.

* * * * *